Nov. 5, 1929.   A. S. LIMPERT   1,734,497
SEALING MEANS FOR REFRIGERATING MACHINES
Filed Nov. 26, 1926
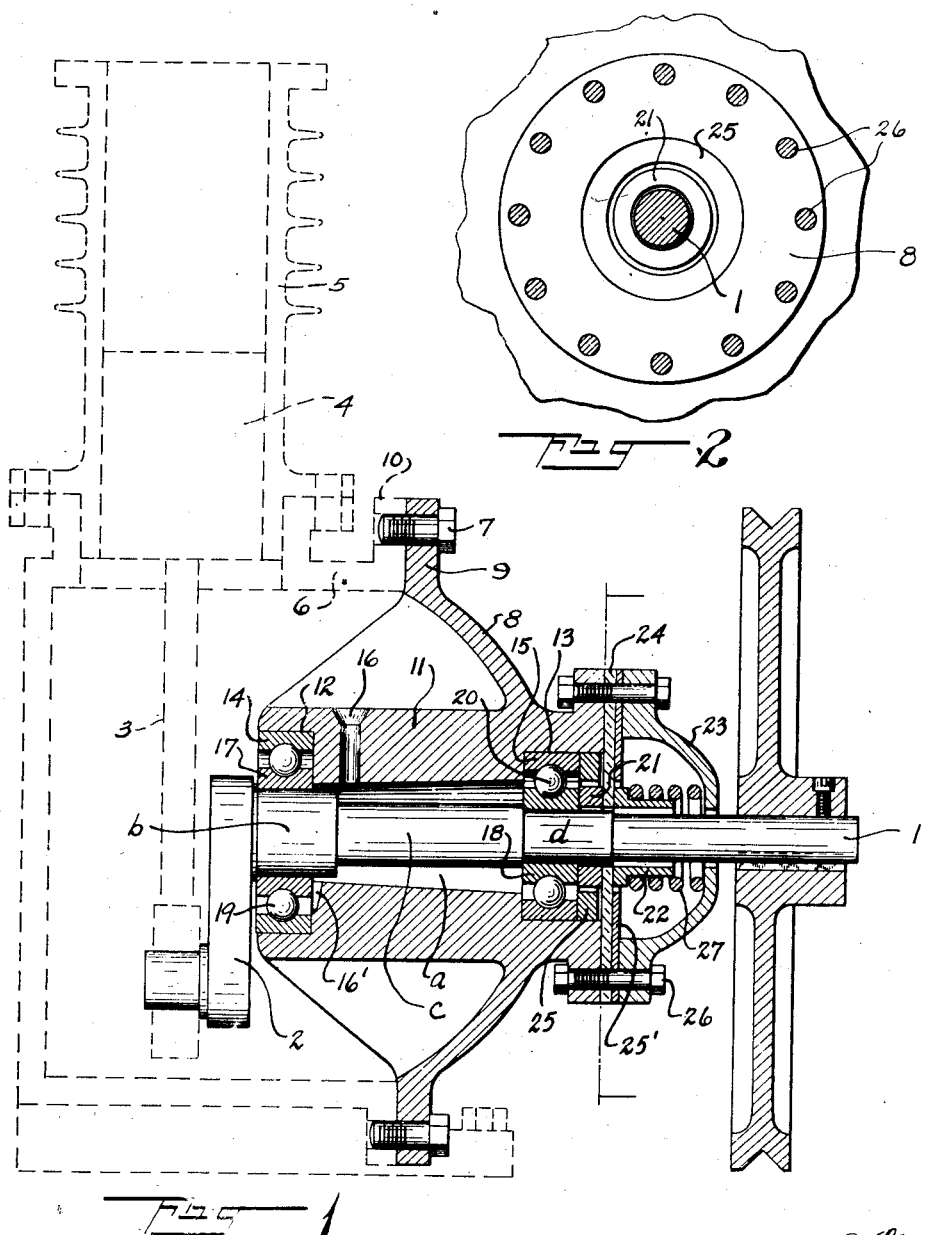
Alexander S. Limpert,
INVENTOR:
BY
His ATTORNEY.

Patented Nov. 5, 1929

1,734,497

UNITED STATES PATENT OFFICE

ALEXANDER S. LIMPERT, OF BAY SHORE, NEW YORK

SEALING MEANS FOR REFRIGERATING MACHINES

Application filed November 26, 1926. Serial No. 150,795.

This invention relates to sealing means for refrigerating systems employing mechanical compressors to effect the liquefaction of the refrigerant employed and has for its particular objects the provision of a simple, durable and effective device for effecting a tight seal of the joint between the rotating crank shaft of the compressor and the journal thereof carried by the housing of the crank case in order to not only prevent the escape of the refrigerant fluid, but also to prevent the entrance of air into the system when the compressor is idle, or in the event the pressure in the system becomes sub-atmospheric.

In the accompanying drawings in which I have illustrated a preferred embodiment of my invention Figure 1 is an essentially vertical section, certain parts being shown in elevation and diagrammatically, illustrating my novel improvement, and Fig. 2 is a section on the line 2—2 of Fig. 1.

Referring to the drawings and the construction shown therein, the reference numeral 1 designates the crank shaft, 2 the crank secured thereto, 3 the connecting rod of the compressor, 4 the piston and 5 the cylinder in which the piston of the compressor operates. The housing 6 of the crank case chamber is provided with a removable journal box which is secured by means of bolts 7 to said housing 6, and as shown, said journal box comprises a casing 8 having an apertured marginal flange 9 adapted to receive said bolts and which is machined on its inner face to tightly fit the corresponding machined face of a flange 10 provided on said housing. A central internally projecting hollow boss or journal 11 is cast integral with said casing and the same is provided with recesses 12 and 13 which are adapted to receive the outer raceways 14 and 15 of two ball bearings and which raceways are tightly fitted into said recesses, so as to be immovable with respect thereto. The ducts 16, 16' serve to admit the passage of lubricant from the crank case chamber into the chamber $a$ surrounding a portion of the crank shaft 1 and thence to the annular space between the raceways of the both bearings. The inner raceways 17 and 18 of the respective ball bearings are tightly fitted onto the crank shaft, the latter raceway being pressed on said shaft to a gas-tight fit, which latter, as shown, is of enlarged cross-sectional area throughout the portion designated by the reference letter $b$, of smaller cross-sectional area throughout the portion indicated by the reference letter $c$, of still smaller cross-sectional area throughout the portion represented by the reference letter $d$, and is still further reduced adjacent its outer end, as shown. The balls 19 and 20 of the respective bearings are adapted to ride in the usual manner in their respective channels formed in the inner and outer raceways. A metal ring 21 is loosely fitted over the portion $d$ of the shaft, the said ring having its inner vertical face ground and being adapted to have a gas-tight fit with the co-operating vertical face of the raceway 18. This ring is preferably imperforate and composed of one of those well known special alloys which has oil-absorbent properties, and consequently self-lubricating qualities, as well as having quick-acting seating properties, but if the same is of steel or bronze, it is advisable to provide lubrication apertures in order that a film of oil will be retained between its inner vertical face and the adjacent vertical face of said raceway. The said metal ring 21 is held against rotation by means of an elastically mounted or floating metal thimble 22 which is mounted on said shaft 1 and positioned within the cap or hub member 23 and which directly contacts with an oil-resisting rubber gasket 24, that in turn engages with the outer vertical face of said metal ring 21. Metal washers 25, 25' are associated with said gasket 24 so as to prevent its outward and inner collapse respectively and the gasket 24 and the washer 25 are both tightly gripped between the inner face of the cap 23 and the outer face of the flange 10 of said journal box by means of bolts 26. As shown, the coil spring 27 serves to elastically force the thimble 22 against the rubber gasket 24 and serves to effect a continuous thrust against the inner raceway 18 of both bearings, which thrust would otherwise, in the absence of ball bearings, have to be taken up or compensated for by the employment of thrust bearings or spring thrust washers.

In the foregoing construction, while I preferably employ two ball bearings, nevertheless, the main bearing or the inner bearing, which is in such a location that no sealing is necessary in proximity thereto, can be dispensed with any other suitable bearing can be utilized in lieu thereof. These ball bearings which are employed have their inner raceways rigidly forced or fitted to the shaft and because of the regular annular construction of such ball bearings they are admirably adapted to take up their own thrust, thus affording a cheaper construction because of the elimination of additional means to take up such thrust.

Among the advantages of the employment of the ball bearings in the manner herein described and particularly the front or outer ball bearing, adjacent which point a tight sealing is essential, is the fact that standard ball bearings are now manufactured with unusual precision and are admirably adapted for my purpose because without further machining they insure a more perfect bearing fit. Furthermore, since ball bearings are inherently adapted to take up both a radial and thrust load, the outer ball bearing employed is adapted to oppose the thrust of the rubber gasket 24 due to the spring 27. Again, because of the fact that in this refrigerant seal it is essential that the inner sealing ring shall engage a hard ground seat, a ball bearing is peculiarly desirable in this location since, as above stated, it is made with the utmost precision and consequently, it has a ground outside face which can be pressed directly against the gasket 24, thereby producing a substantially perfect fit therebetween. Otherwise, an additional specially ground ring would have to be interposed to accomplish this object.

By virtue of the fact that the journal box carries not only the main bearing, but also the sealing means, it is possible to construct the entire journal box or gland as a separate unit which is then subsequently bolted to the crank case or housing and consequently in the event of any breakdown or repairs being necessary, it is a comparatively simple matter to install a new gland. The renewal of this unit gland virtually results in the renewal of the entire compressor, except for the piston and cylinder which would be the only other parts that would be likely to wear and thus, as is evident, my construction is peculiarly durable and lends itself readily to being rebuilt or repaired.

The problem of the effective seal of the stuffing-box of a refrigerant is effectively solved by my invention, as herein described, since as is evident from the construction, the inner raceway of the outer ball bearing (in so far as the main or inner ball bearing is concerned, the same may be ignored in consideration of the sealing problem), has a forced or tight press fit with the shaft, so that no gas leakage occurs therebetween and the ground outer face of this raceway will directly engage the adjacent vertical ground face of the metal ring 21, thus affording another ground, and consequently leak-proof, joint. The said metal ring is effectively held in tight engagement with the rotating raceway 18 by virtue of the pressure of the floating thimble 22 against the rubber gasket 24 that in turn directly engages the outer vertical face of said ring 21 and thereby all leakage between the shaft and its journal is precluded. Furthermore, because of the precision, as aforesaid, with which ball bearings are made, it is possible because of the machining operations which are eliminated by the employment of the same to provide ball bearings for the crank shaft and to seal the same at less expense than when employing the usual sealing means wherein several machining operations are required to effect a substantial seal.

Without departing from the spirit of my invention, as herein set forth, various modifications and changes within the scope of the appended claims may be made.

Having thus described my invention, what I claim and desire to obtain by United States Letters Patent is:—

1. A sealing means for compressor shafts of refrigerating machinery, comprising a main shaft concentrically mounted in an anti-friction bearing, which is adapted to take up the thrust of said shaft, said bearing having inner and outer raceways and rolling elements mounted therebetween, a housing through which said shaft projects and sealing means having a gas-tight fit with the outer end of the inner raceway of the bearing for preventing the escape of fluid through the joint between the shaft and the housing, said sealing means including a spring-pressed gasket, a floating metallic washer mounted on said shaft and interposed between the outer end of said inner raceway and said gasket, which ring is adapted to permit of a film of lubricant being maintained between the inner face thereof and the adjacent face of said inner raceway.

2. In a refrigerating machine, the combination comprising a high-pressure chamber, a journal carried by the casing of said chamber, a compressor shaft mounted in an anti-friction bearing carried by said journal, said bearing being adapted to take up the thrust of said shaft, said shaft and said journal each having tightly fitted thereto a ring constituting the inner and outer raceways respectively of said bearing, a plurality of rolling elements adapted to travel between said raceways, a floating metallic washer loosely fitting said shaft next to said inner raceway, said washer being of such a dimension that one of its faces has extensive contact with the adjacent end of said inner raceway when they are in engagement with each other, a flexible gasket adjacent the side of said washer which is distant from said inner raceway, rigid means for preventing undue collapse of said gasket, means including a sleeve mounted on said shaft beyond said gasket and a spring for normally pressing said sleeve in engagement with said gasket and for forcing the latter into intimate contact with the adjacent end of the inner raceway, and a removable cap for preventing the escape of said spring for maintaining the same under a predetermined tension and for securing said gasket to said casing.

3. In a refrigerating machine, the combination with its compressor shaft and its journal, of an anti-friction bearing which is adapted to take up the thrust of said shaft, said bearing having inner and outer raceways and rolling elements mounted therebetween, the inner raceway of said bearing surrounding and having a gas tight fit with said shaft and the other raceway being rigidly fitted to said journal, a spring-pressed floating metallic washer, relatively movable with respect to said shaft and loosely mounted thereon, arranged to have gas-tight fit with the outer end of said inner raceway, a non-rotating compressible non-metallic gasket and means for holding the adjacent faces of said floating washer and said gasket in elastic gas tight engagement with each other.

4. In a refrigerating machine of the compressor type, the combination with a shaft of a compressor and the wall of a high-pressure chamber through which said shaft projects, of a housing removably secured to said wall, the same being provided with sealing means for preventing the escape of refrigerant from said high-pressure chamber, which sealing means includes as an essential part therof an anti-friction bearing which is adapted to take up the thrust of said shaft, said bearing having inner and outer raceways and rolling elements mounted therebetween, the inner raceway of said bearing having a gas-tight fit with said crank shaft and a co-operating stationary member immediately adjacent said raceway and between it and the outer end of the shaft which is adapted to have permanent engagement with the outer end of said raceway and which has a lubricated and gas-tight fit therewith.

Signed at New York, in the county and State of New York, this 22nd day of November, 1926.

ALEXANDER S. LIMPERT.